(12) United States Patent
Hong et al.

(10) Patent No.: US 6,491,862 B1
(45) Date of Patent: *Dec. 10, 2002

(54) METHOD FOR PRODUCING SIC PREFORM WITH HIGH VOLUME FRACTION

(75) Inventors: Soon Hyung Hong, Daejeon Kwangyeok-si; Hyo Soo Lee, Seoul; Kyung Yoon Jeon, Pusan Kwangyeok-si, all of (KR)

(73) Assignee: Korea Advanced Institute of Science and Technology, Kwangyeok-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/688,829

(22) Filed: Oct. 17, 2000

(30) Foreign Application Priority Data

Mar. 31, 2000 (KR) .............................. 00-16821

(51) Int. Cl.$^7$ ................................. B28B 3/02
(52) U.S. Cl. .................. 264/651; 264/669; 264/670; 264/86; 264/87
(58) Field of Search ............................. 264/651, 86, 87, 264/669, 670

(56) References Cited

U.S. PATENT DOCUMENTS

| | | | |
|---|---|---|---|
| 4,883,621 A | * 11/1989 | Natori et al. | 264/86 |
| 4,976,903 A | * 12/1990 | Matsuhisa et al. | 264/86 |
| 6,190,604 B1 | * 2/2001 | Hong et al. | 264/651 |
| 6,228,293 B1 | * 5/2001 | Kriegsmann et al. | 264/29.7 |

OTHER PUBLICATIONS

Derwent Acc—No. 2000–617275, Nov. 1999.*
Abstract of JP403281741A, Dec. 1991.*

* cited by examiner

*Primary Examiner*—James Derrington
(74) *Attorney, Agent, or Firm*—Rosenberg, Klein & Lee

(57) ABSTRACT

Disclosed is a method for producing an SiC preform of a high volume fraction used for the manufacture of a metal matrix composite. The method involves the steps of mixing SiC particles of different particle sizes each selected from a range of 0.2 to 48 $\mu$m with an organic binder, an inorganic binder, an aggregating agent, and distilled water, thereby producing a mixture, and stirring the mixture in accordance with a ball milling process, thereby producing a slurry containing the SiC particles, pouring the slurry containing the SiC particles into a mold having upper and lower molds respectively provided with absorbent bodies, and squeezing the slurry in the mold, thereby reducing a residual moisture content of the slurry, completely drying the slurry reduced in residual moisture content, thereby producing an SiC preform, and calcinating the SiC preform. The preform is impregnated with a metal matrix while maintaining a high reinforcement volume fraction of 70 vol % or more. Accordingly, this preform can be widely used for fundamental materials of metal matrix composites used to manufacture electronic packaging components and aerospace components requiring a low thermal expansion coefficient and a high thermal conductivity.

7 Claims, 7 Drawing Sheets

METHOD FOR PRODUCING SIC PREFORM WITH HIGH VOLUME FRACTION

BACKGROUND OF THE INVENTION

1. Field of the Invention

The present invention relates to a method for producing a preform used for the manufacture of a metal matrix composite, and more particularly to a method for producing an SiC preform having a high volume fraction of 70% or more using SiC powder in accordance with a ball milling and pressing process.

2. Description of the Related Art

The remarkable technical development in the 1990's in technical fields associated with electronic components has resulted in requirements for the materials of electronic packaging components to have specific characteristics as follows.

First, the material of an electronic packaging component should have a thermal expansion coefficient similar to that of a semiconductor chip encapsulated by that packaging component. By virtue of such a thermal expansion coefficient, it is possible to minimize thermal stress generated due to a thermal expansion coefficient difference between the semiconductor chip and the material of the electronic packaging component when heat is generated from the electronic packaging component. By virtue of such an electronic packaging component, an improvement in the life of semiconductor devices may be achieved.

Second, for an electronic packaging component, it is necessary to select a material capable of efficiently discharging heat generated from a semiconductor device using the electronic packaging component. Since semiconductor devices are sensitive to heat and impact, products using such semiconductor devices should be protected from impact. Such products should also have an ability to easily discharge heat.

Recently, electronic products have been developed toward a compact size so that they are conveniently portable. For such compact electronic products, accordingly, materials having characteristics of a low density have been preferably used. For such low-density materials, there may be metal matrix composites which have been recently highlighted for electronic packaging materials.

Metal matrix composites have characteristics of a high thermal conductivity and superior mechanical characteristics while exhibiting a relatively good workability because they use a metal matrix. Such metal matrix composites also has a low thermal expansion coefficient, as compared to other metal materials, because they use, as a reinforcement, ceramic having a low thermal expansion coefficient, thereby causing the thermal expansion of the metal matrix to be suppressed. Such metal matrix composites may also have designing characteristics capable of adjusting the thermal expansion coefficient thereof to a desired level. Such designing characteristics may be obtained by adjusting the volume fraction of the reinforcement. By virtue of such characteristics, metal matrix composites have been highlighted in association with applications to materials of electronic packaging components and materials of aerospace products, such as artificial satellites or spaceships, which should be strictly controlled in terms of a dimension variation resulting from a thermal expansion.

Such an increased interest in metal matrix composites has also resulted in an increased interest in reinforcement preforms used in the production of those metal matrix composites.

For a conventional preform production method, there may be a vacuum-assisted extraction method which is mainly used in the production of fiber preforms. This vacuum-assisted extraction method is a method of mechanically mixing a reinforcement with a binder in a stirrer, thereby forming a slurry, and extracting the slurry in vacuum, thereby producing a reinforcement preform. Such a particle reinforcement preform produced in accordance with such a vacuum-assisted extraction method has an average reinforcement volume fraction of about 50%. In order to use such a preform for the production of a metal matrix composite for electronic packaging components, however, the reinforcement volume fraction should be 70% or more. When the preform has a reinforcement volume fraction of 70% or more, it can have a thermal expansion coefficient of 6 to 7 ppm/K similar to those of semiconductor chips.

SUMMARY OF THE INVENTION

Therefore, an object of the invention is to provide a method for producing an SiC preform, which has a high volume fraction, and is capable of a reinforcement for metal matrix composites, using a ball milling and pressing process.

In accordance with the present invention, this object is accomplished by providing a method for producing an SiC preform having a high volume fraction, comprising the steps of: mixing SiC particles of different particle sizes each selected from a range of 0.2 to 48 $\mu$m with an organic binder, an inorganic binder, an aggregating agent, and distilled water, thereby producing a mixture, and stirring the mixture in accordance with a ball milling process, thereby producing a slurry containing the SiC particles; pouring the slurry containing the SiC particles into a mold having upper and lower molds respectively provided with absorbent bodies, and squeezing the slurry in the mold, thereby reducing a residual moisture content of the slurry; completely drying the slurry reduced in residual moisture content, thereby producing an SiC preform; and calcinating the SiC preform.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
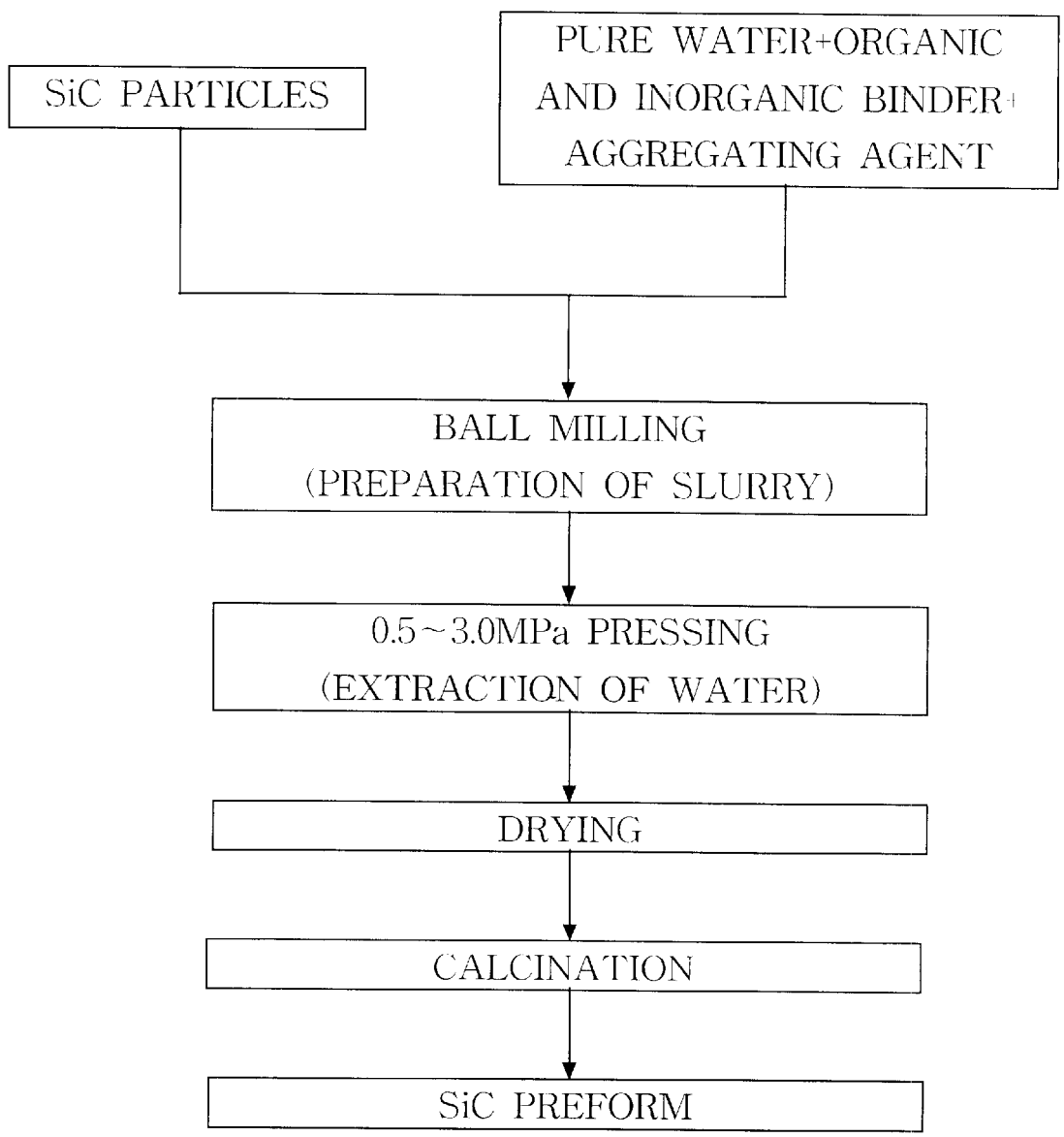
FIG. 1 is a flow chart illustrating a method for producing an SiC preform in accordance with the present invention.

FIG. 1 is a flow chart illustrating a method for producing an SiC preform in accordance with the present invention. Now, the method of the present invention will be described in detail, with reference to FIG. 1.

In accordance with this method, in order to produce an SiC preform, SiC particles are first prepared which has a particle size of 0.2 to 48 μm. For example, SiC particles having average particle sizes of 3 μm, 6.5 μm, 8 μm, 10 μm, 40 μm, or 48 μm may be mainly used. Preferably, SiC particles having at least two different average particle sizes are used in a mixed state in order to obtain an improved volume fraction of the finally produced SiC preform. The SiC particles having two different average particle sizes may be those of 3 μm and 40 μm, those of 6.5 μm and 40 μm, 10 μm and 40 μm, or 8 μm and 48 μm. Such SiC particles having two different average particle sizes are mixed in a weight ratio ranging from 1:9 to 9:1.

SiC particles are then mixed with distilled water to produce a slurry. Taking into consideration the strength and thermal conductivity characteristics of the preform finally produced, an inorganic binder such as colloidal silica is added in a concentration of 0.1 to 10 weight % in the mixture. In order to produce a slurry of a good quality, the mixture is also added with 0.1 to 1.5 weight % of an organic binder such as cationic starch, and 0.5 to 1.5 weight % of an aggregating agent such as polyacrylamide. Taking into consideration the hydrostatic point of the added particles and the gellation of the inorganic binder, acetic acid is also added to the mixture in an amount of 0.5 to 2 weight % to adjust the pH of the produced slurry in a range of 2.7 to 3.5.

The resultant mixture is then stirred for 4 to 12 hours in accordance with a ball milling process using alumina balls in order to well disperse the organic binder, inorganic binder, and aggregating agent among the SiC particles while minimizing the breakage of the SiC particles. As a result, a slurry in a well mixed state is produced.

In order to mold the slurry containing SiC particles into a preform, that slurry is poured into a mold in which absorbent bodies are provided at upper and lower molds. A pressure of 0.5 to 3 MPa is applied to the slurry in the mold in one axial direction to squeeze the slurry. By virtue of the applied pressure, moisture is squeezed from the slurry. This moisture is absorbed into the absorbent bodies of the upper and lower molds. The moisture may also be outwardly discharged from the mold. Thus, the residual moisture content of the resultant preform is minimized.

Thereafter, the resultant slurry is subjected to a complete drying process. For example, the slurry is naturally dried at room temperature for 48 hours or less, and then forcibly dried at a temperature of 100° C. in a drying oven for 27 hours or less. In accordance with such two drying steps, the preform is completely dried. If the preform is incompletely dried, then the moisture left in the preform is abruptly evaporated at a subsequent calcination step, thereby causing the preform to have defects such as cracks. When a metal matrix material is impregnated into the preform to produce a metal matrix composite, metal matrix layers may be locally formed in the metal matrix composite at the defected portions of the preform. That is, the metal matrix composite may be free of the preform material, that is, the reinforcement, at portions thereof formed with the metal matrix layers. For this reason, the metal matrix composite may have a degraded performance. Furthermore, it may be difficult to produce a desired metal matrix composite.

In order to prevent an insufficient drying of the preform causing the above mentioned problem, the above mentioned complete drying process involving two drying steps, that is, a natural drying step and a forced drying step, is carried out in accordance with the present invention to completely dry the preform.

The calcination process conducted for the preform following the complete drying process is carried out at a temperature of 800 to 1,100° C. for 2 to 6 hours. At the temperature of 800 to 1,100° C., the inorganic binder is begun to form a cristobalite.

Figure 2A:
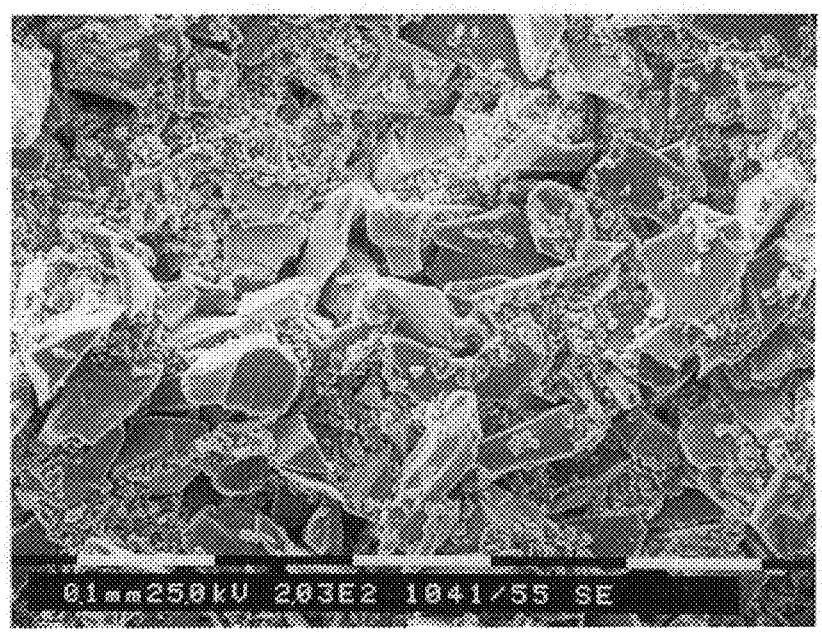
FIG. 2a is a microscopic photograph of a preform formed using a mold provided with absorbent bodies in accordance with the present invention.
Figure 2B:
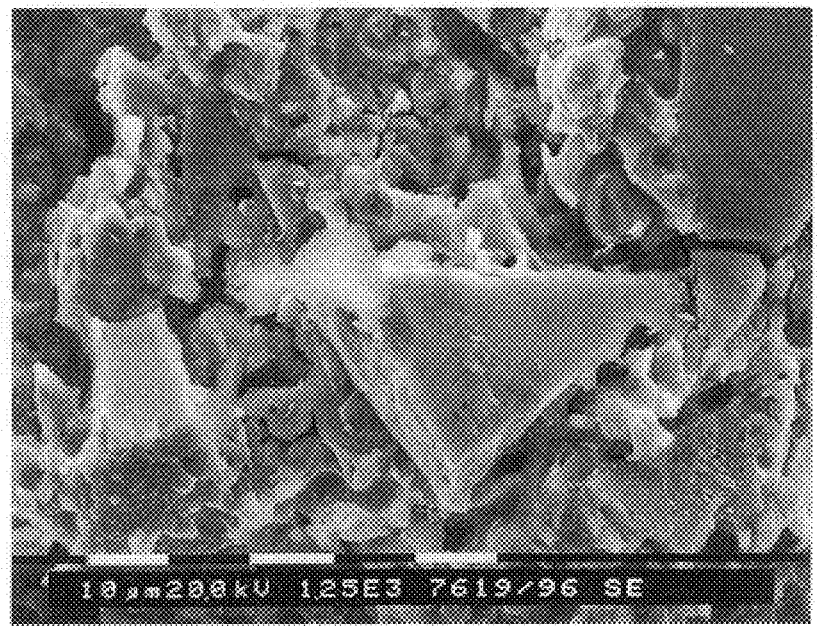
FIG. 2b is a microscopic photograph of a preform formed using a mold not provided with any absorbent body in accordance with a conventional method.

FIG. 2a is a microscopic photograph of a preform formed using a mold provided with absorbent bodies. FIG. 2b is a microscopic photograph of a preform formed using a mold not provided with any absorbent body. Referring to FIGS. 2a and 2b, it can be found that the preform of FIG. 2a has a microstructure more uniform and regular than that of the preform shown in FIG. 2b.

The present invention will now be described in detail with reference to the following examples and comparative examples, but the present invention is not to be construed as being limited thereto.

EXAMPLES 1 to 9

A mixture for producing a slurry was prepared by mixing SiC particles with distilled water while adding 3 weight % of colloidal silica as an inorganic binder, 1 weight % of cationic starch as an organic binder, and 0.5 weight % of polyacrylamide as an aggregating agent. The SiC particles were prepared using SiC particles having a particle size of 3 μm (Example 1), SiC particles having a particle size of 6.5 μm (Example 2), SiC particles having a particle size of 8 μm (Example 3), SiC particles having a particle size of 19 μm (Example 4), SiC particles having a particle size of 40 μm (Example 5), SiC particles having a particle size of 48 μm (Example 6), an SiC particle mixture containing SiC particles having a particle size of 10 μm and SiC particles having a particle size of 40 μm in a volume ratio of 1:2 (Example 7), an SiC particle mixture containing SiC particles having a particle size of 8 μm and SiC particles having a particle size of 48 μm in a volume ratio of 1:2 (Example 8), or an SiC particle mixture containing SiC particles having a particle size of 0.2 μm, SiC particles having a particle size of 3 μm and SiC particles having a particle size of 48 μm in a volume ratio of 1:2:7 (Example 9). Taking into consideration the hydrostatic point of the added particles and the gellation of the inorganic binder, acetic acid was also added to the mixture in an amount of 0.5 weight % to produce a slurry to have a pH of 3.

The prepared mixture was then stirred for 8 hours in accordance with a ball milling process using alumina balls in order to well disperse the organic binder, inorganic binder, and aggregating agent among the SiC particles while minimizing the breakage of the SiC particles. As a result, a slurry in a well mixed state was produced.

In order to mold the slurry containing SiC particles into a preform, the produced slurry was poured into a mold in which absorbent bodies are provided at upper and lower molds. A pressure of 1.2 MPa was applied to the slurry in the mold in one axial direction to squeeze the slurry. By virtue of the applied pressure, moisture was squeezed from the slurry. This moisture was absorbed into the absorbent bodies of the upper and lower molds. Thus, the residual moisture content of the resultant preform was minimized.

Thereafter, the resultant slurry was dried using a drying process involving two drying steps. That is, the slurry was naturally dried at room temperature for 48 hours, and then forcibly dried at a temperature of 100° C. in a drying oven for 24 hours, thereby producing a preform. The produced preform was then subjected to a calcination process.

The calcination process was conducted for 5 hours at a temperature of 1,000° C. at which the inorganic binder is begun to form a cristobalite.

Respective volume fractions (vol %) of SiC preforms ced in accordance with Examples 1 to 9 were measured an image analyzer method, and the measurement results described in the following Table 1.

TABLE 1

Volume Fraction of SiC Preform, Produced Using Present Invention, Depending on Particle Size of SiC Particles

| Example | Average Particle Size and Mixing Ratio of SiC Particles | Volume Fraction (vol %) |
|---|---|---|
| 1 | 3 μm | 57.5 |
| 2 | 6.5 μm | 60.1 |
| 3 | 8 μm | 60.2 |
| 4 | 10 μm | 51.1 |
| 5 | 40 μm | 59.0 |
| 6 | 48 μm | 59.0 |
| 7 | 10 μm + 40 μm(1:2) | 63.8 |
| 8 | 8 μm + 48 μm(1:2) | 71.0 |
| 9 | 0.2 μm + 3 μm + 48 μm(1:2) | 76.0 |

Figure 3:
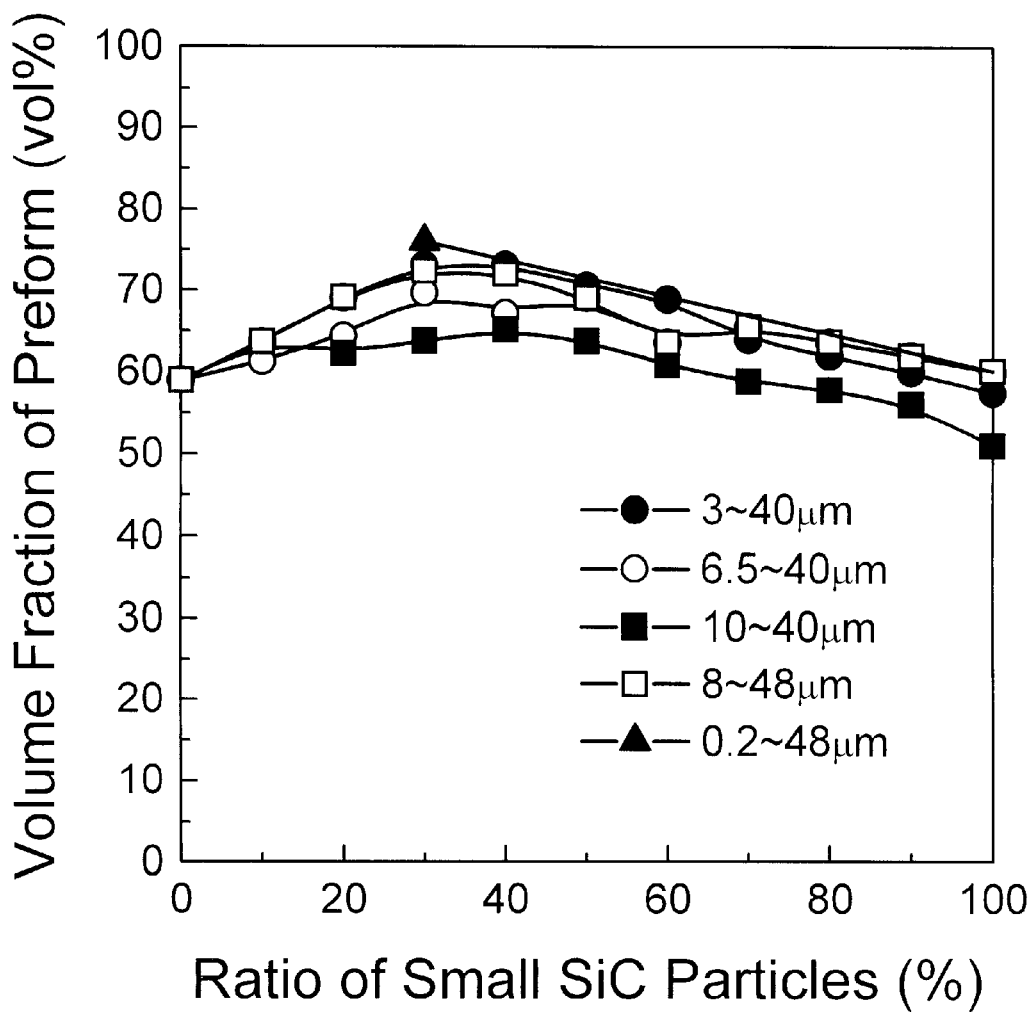
FIG. 3 is a graph depicting a variation in the volume fraction of a preform depending on a variation in the mixing ratio of SiC particles.

Referring to Table 1, it can be found that the preforms of Examples 8 and 9 exhibit a high volume fraction of 70 vol % or more. In particular, the preform of Example 8 using the SiC particle mixture containing SiC particles having a particle size of 8 μm and SiC particles having a particle size of 48 μm in a volume ratio of 1:2 exhibits a high SiC volume fraction of 71.0 vol %. A superior SiC volume fraction of 76.0 is obtained in the preform of Example 9 using the SiC particle mixture containing SiC particles having a particle size of 0.2 μm, SiC particles having a particle size of 3 μm and SiC particles having a particle size of 48 μm in a volume ratio of 1:2:7. The measurement results of Table 1 are also depicted in FIG. 3.

EXAMPLE 10

SiC preforms were produced using the method of Example 9 while varying the squeezing pressure, used in the production of SiC preforms, in a range of 0.5 to 3.0 Mpa, and then measured in terms of the volume fraction and compressive strength. The measurement results are depicted in FIGS. 4 and 5, respectively.

Figure 4:
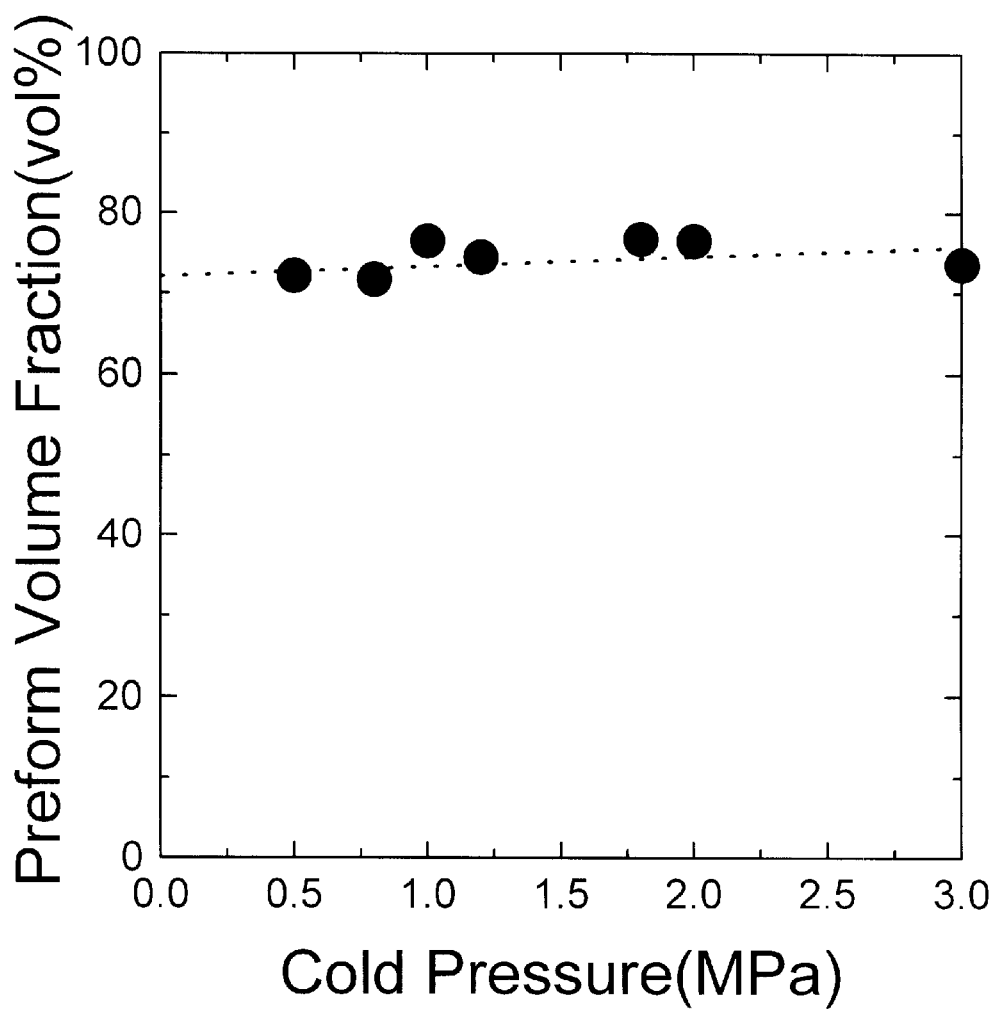
FIG. 4 is a graph depicting a variation in the volume fraction of a preform depending on a variation in the squeezing pressure used in the production of the preform.
Figure 5:
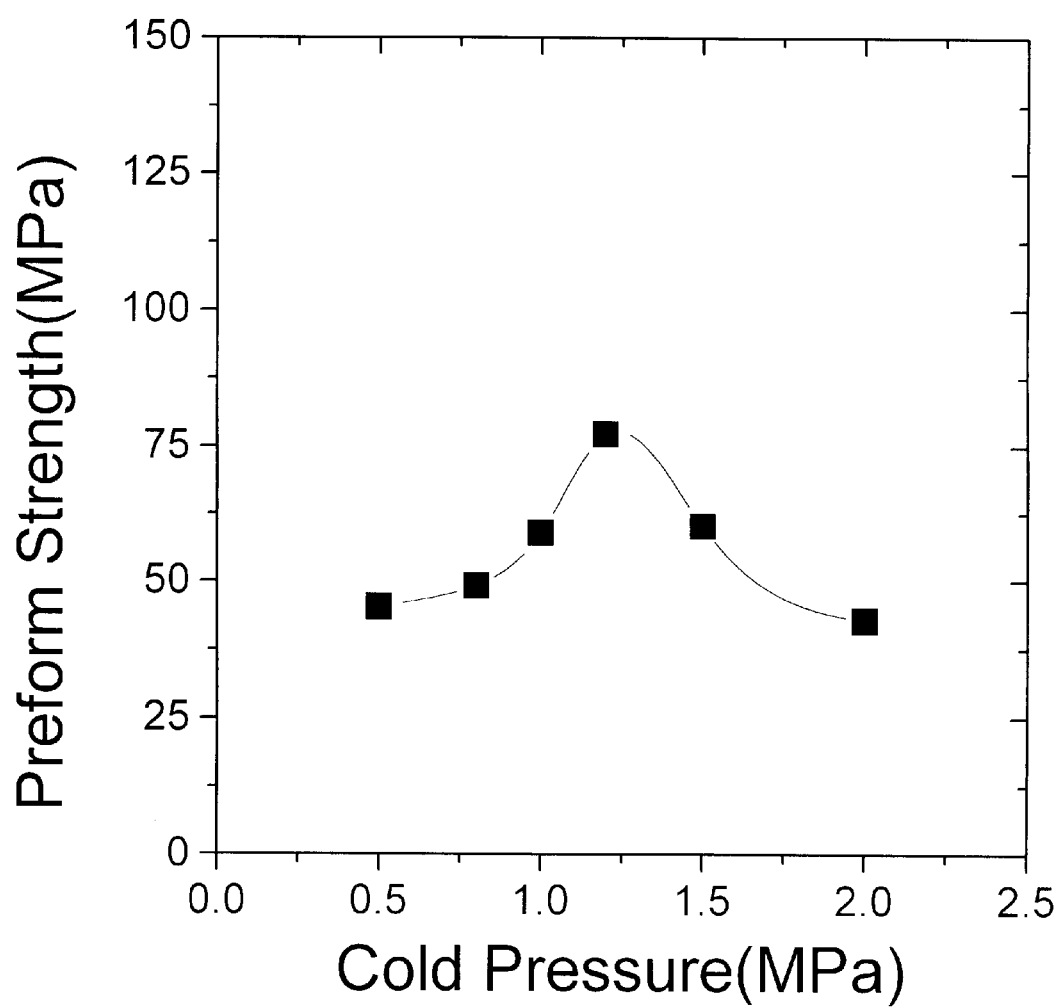
FIG. 5 is a graph depicting a variation in the compressive strength of a preform depending on a variation in the squeezing pressure used in the production of the preform.

Referring to FIG. 4, it can be found that there is little volume fraction variation depending on a variation in the squeezing pressure used in the production of the preforms. Referring to FIG. 5, it can be found that where a squeezing pressure of 1.2 MPa is used, a compressive strength of 60 MPa or more is obtained.

Example 11

Figure 6A:
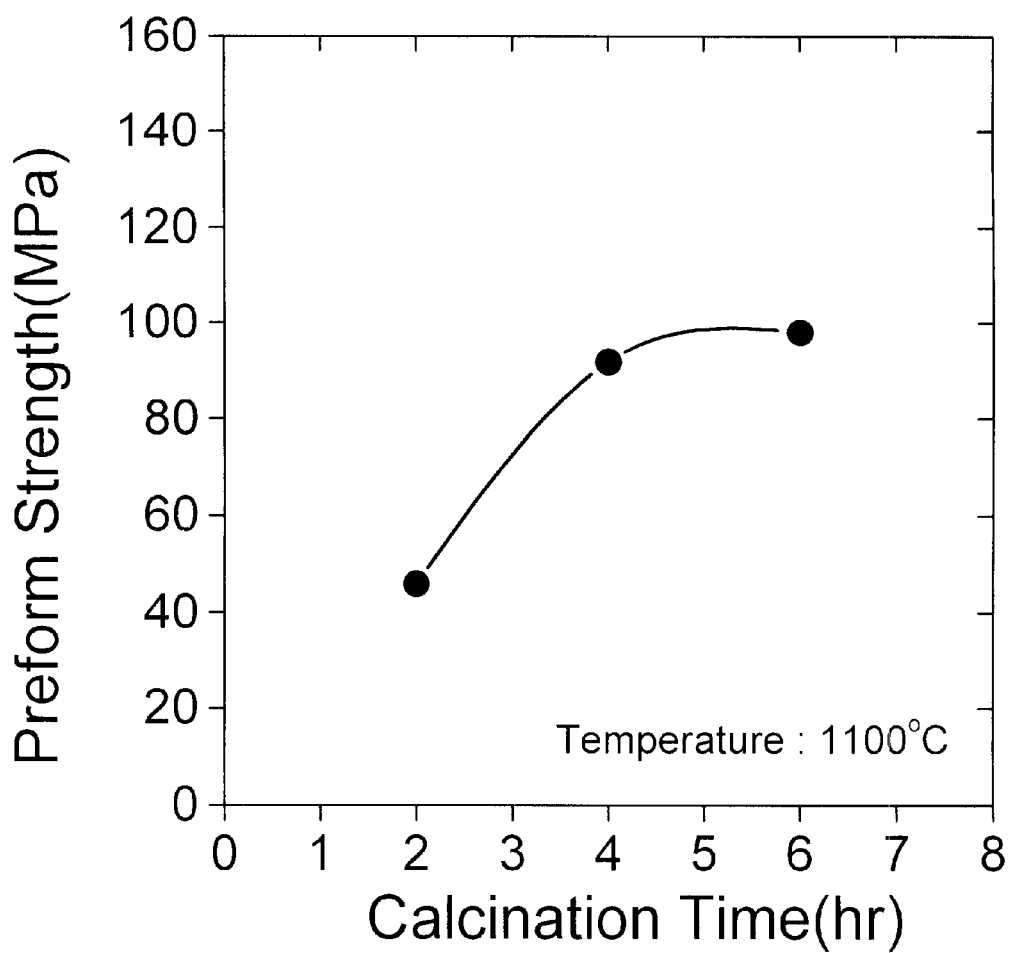
FIG. 6a is a graph depicting a variation in the compressive strength of a preform depending on a variation in calcination time.
Figure 6B:
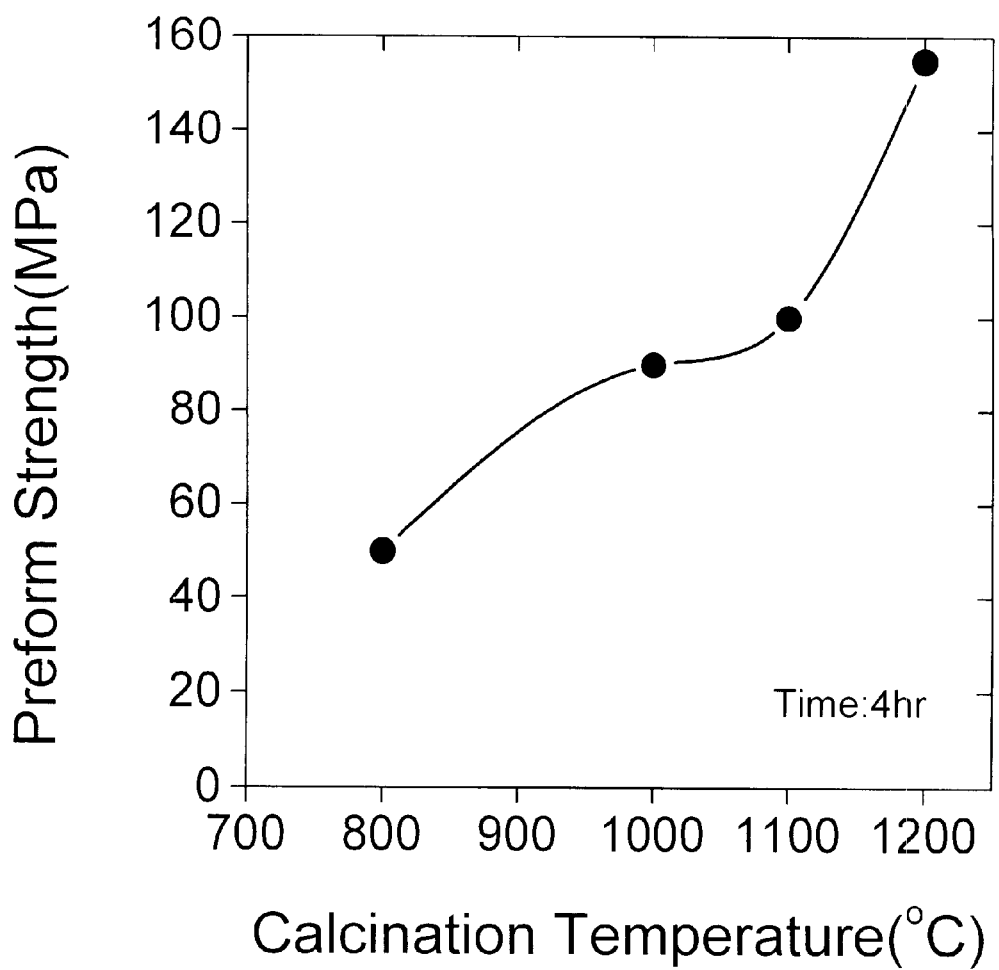
FIG. 6b is a graph depicting a variation in the compressive strength of a preform depending on a variation in calcination temperature.

SiC preforms were produced using the method of Example 9 while varying the calcination time and calcination temperature used in the production of SiC preforms, and then measured in terms of the compressive strength. The measurement results are depicted in FIGS. 6a and 6b, respectively. FIG. 6a illustrates a variation in compressive strength depending on a variation in calcination time under the condition in which the calcination temperature is fixed at 1,100° C. Referring to FIG. 6a, it can be found that where a calcination time of 4 hours is used, a compressive strength approximate to 100 MPa is obtained. It can also be found that there is little increase in compressive strength even though the calcination time is extended from 4 hours. FIG. 6b is a variation in compressive strength depending on a variation in calcination temperature under the condition in which the calcination time is fixed to 4 hours. Referring to FIG. 6b, it can be found that a gradual increase in compressive strength is exhibited as the calcination temperature is increased from 800° C. to 1,200° C.

Comparative Examples 1 to 9

SiC preforms were produced using compositions of the ing Table 2 in accordance with a conventional vacuum tion method, respectively. Respective volume ons (vol %) of the SiC preforms were measured using an analyzer method. The measurement results were bed in Table 2.

TABLE 2

Volume Fraction of SiC Preform, Produced Using Conventional Vacuum Extraction Method, Depending on Particle Size of SiC Particles

| Comparative Example | Average Particle Size and Mixing Ratio of SiC Particles | Inorganic Binder (wt %) | Organic Binder (wt %) | Aggregating Agent (wt %) | Acetic Acid (wt %) | Volume Fraction (vol %) |
|---|---|---|---|---|---|---|
| 1 | 8 μm | 3 | 1 | 0.5 | 1 | 52.0 |
| 2 | 12 μm | 3 | 0 | 0 | 0 | 51.5 |
| 3 | 25 μm | 3 | 1 | 0.5 | 1 | 50.8 |
| 4 | 48 μm | 3 | 1 | 0.5 | 1 | 49.1 |
| 5 | 8 μm + 25 μm(1:2) | 3 | 0 | 0 | 0 | 51.0 |
| 6 | 12 μm + 25 μm(1:2) | 3 | 0 | 0 | 0 | 51.2 |
| 7 | 25 μm + 48 μm(1:2) | 3 | 1 | 0.5 | 1 | 51.0 |
| 8 | 8 μm + 48 μm(1:2) | 3 | 1 | 0.5 | 1 | 53.0 |
| 9 | 8 μm + 48 μm(1:2) | 3 | 0 | 0 | 0 | 55.0 |

Referring to Table 2, it can be found that the SiC preforms produced using the conventional vacuum extraction method have an SiC volume fraction of 50 to 55 vol % less than the SiC volume fraction of 71 to 76 vol % obtained in accordance with the present invention. Accordingly, it is difficult to produce an SiC preform having a desired high SiC volume fraction in accordance with the convention method.

As apparent from the above description, the present invention provides a preform production method capable of easily producing a preform having a high volume fraction within a reduced production time without involving an increase in the equipment costs. Accordingly, the method of the present invention is a method capable of achieving a mass production. In particular, the preform produced in accordance with the present invention, which is impregnated with a metal matrix while maintaining a high reinforcement volume fraction, may be widely used for fundamental materials of metal matrix composites used to manufacture electronic packaging components and aerospace components requiring a low thermal expansion coefficient and a high thermal conductivity.

What is claimed is:

1. A method for producing an SiC preform having a high volume fraction, comprising the steps of:

mixing SiC particles of different particle sizes each selected from a range of 0.2 to 48 μm with an organic binder, an inorganic binder, an aggregating agent, and distilled water, thereby producing a mixture, and stirring the mixture in accordance with a ball milling process, thereby producing a slurry containing the SiC particles;

pouring the slurry containing the SiC particles into a mold having upper and lower molds respectively provided with absorbent bodies, and squeezing the slurry in the mold, thereby reducing a residual moisture content of the slurry;

completely drying the slurry reduced in residual moisture content, thereby producing an SiC preform; and calcinating the SiC preform.

2. The method according to claim 1, wherein cationic starch is added in a concentration of 0.1 to 5 weight % for the organic binder.

3. The method according to claim 1, wherein colloidal silica is added in a concentration of 0.1 to 10 weight % for the inorganic binder.

4. The method according to claim 1, wherein polyacrylamide is added in a concentration of 0.1 to 5 weight % for the aggregating agent.

5. The method according to claim 1, wherein the squeezing step is carried out in an axial direction under a pressure of 0.50 to 3.00 MPa.

6. The method according to claim 1, wherein the calcinating step is carried out at a temperature of 800 to 1,100° C. for 2 to 6 hours.

7. The method according to claim 1, wherein the complete drying step comprises the steps of:

naturally drying the slurry reduced in residual moisture content at room temperature for 48 hours or less; and forcibly drying the naturally dried slurry at a temperature of 100° C. for 27 hours or less.

* * * * *